H. THOMPSON.
Tire-Tightener.
No. 43,722.
Patented Aug. 2, 1864.
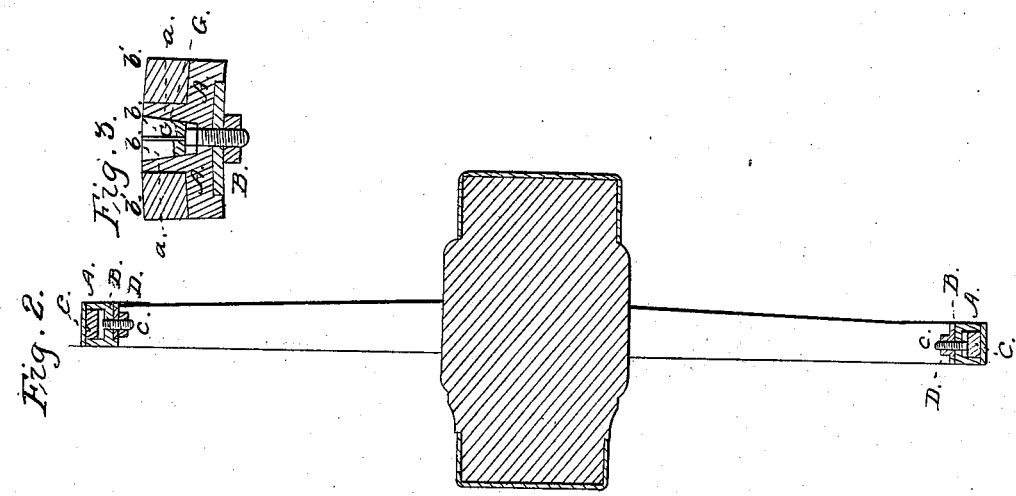
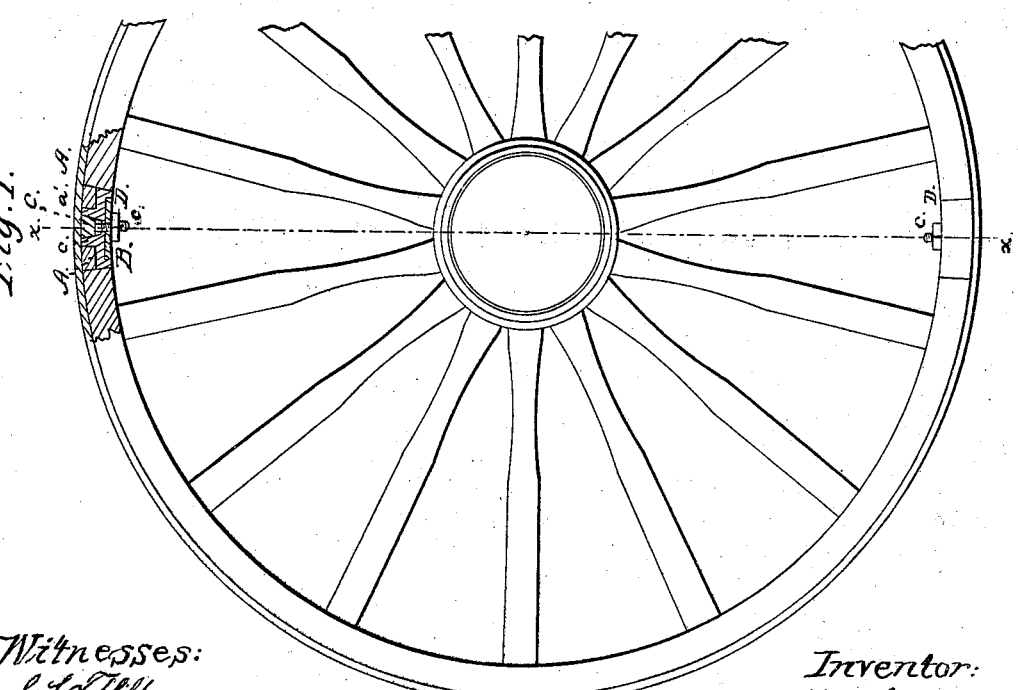
Witnesses:
Inventor:

UNITED STATES PATENT OFFICE.

HENRY THOMPSON, OF PALMYRA, WISCONSIN.

IMPROVEMENT IN TIGHTENING FELLIES.

Specification forming part of Letters Patent No. 43,722, dated August 2, 1864.

*To all whom it may concern:*

Be it known that I, HENRY THOMPSON, of Palmyra, in the county of Jefferson and State of Wisconsin, have invented a new and Improved Felly-Tightening Attachment for the Wheels of Vehicles; and I do hereby declare that the following is a full, clear, and exact description thereof, which will enable others skilled in the art to make and use the same, reference being had to the accompanying drawings, making a part of this specification, in which—

Figure 1 is a side or face view of a wheel provided with my invention; Fig. 2, a section of the same taken in the line $x\,x$, Fig. 1; Fig. 3, a detached longitudinal section of my invention.

Similar letters of reference indicate like parts.

This invention relates to a new and improved attachment for the wheels of vehicles; and it is designed to compensate for the shrinkage of the wheels so that the fellies or rim may be expanded whenever required to cause the tire to always fit snugly thereto, thereby avoiding the necessity of cutting and rewelding the tire or shrinking the same, which is now done when the tire becomes loose on account of the shrinking of the wheel.

The invention also serves as a protection for the ends of the fellies, preventing the same from splitting and wearing, a contingency which now frequently occurs.

A A represents two parts of a metal box which are precisely alike and each divided by a partition, $a$, into two compartments or divisions, $b\,b'$, one, $b$, being considerably smaller than the other one, $b'$. The partitions $a$ are inclined at the side adjoining the compartments $b$, but the other sides in the compartments $b'$ are about at right angles with the bottom or inner sides of the parts A A. The two parts A A abut snugly against each other, but they are not secured in contact by any permanent fastening, a dovetail guide-plate, B, being fitted in a dovetail-groove in the outer sides of the bottoms of the parts A A to admit of the latter being adjusted nearer together or farther apart, and being kept in line or in a proper relative position with each other.

In the compartments $b\,b$ of the two parts A A of the box there is fitted a wedge-shaped head, C, formed by having two inclined sides corresponding to the inclined sides of the partitions $a\,a$, as shown clearly in Fig. 1. This head C is provided with a stem, $c$, which has a screw-thread cut upon it, and passes through the guide-plate B, a nut, D, being fitted on the stem at the outer side of the guide-plate.

The ends of the fellies are fitted in the compartments $b\,b'$, which serve to protect them, preventing them from splitting and wearing off at the ends. The sides of the parts A A project outward to the edges of the fellies or rims and the tire E passes over said sides.

From the above description it will be seen that in case the wheel should shrink so as to loosen the tire E on the wheel all that is required is to draw inward the head C by turning the nut D, and the two parts A A will therefore be forced apart and the rim or fellies expanded so that the tire will fit snugly on them.

I claim as new and desire to secure by Letters Patent—

The metallic box composed of two parts, A A, provided each with a partition, $a$, to divide said parts into two compartments, $b\,b'$, in connection with the guide-plate B and the adjustable wedge-shaped head C, all arranged and applied to the wheel, substantially as and for the purpose herein set forth.

HENRY THOMPSON.

Witnesses:
J. A. ALLEN,
M. POTTER.